United States Patent
Khalid et al.

(10) Patent No.: US 8,447,039 B2
(45) Date of Patent: May 21, 2013

(54) ACTIVE-ACTIVE HIERARCHICAL KEY SERVERS

(75) Inventors: Mohamed Khalid, Gary, NC (US); Rajiv Asati, Morrisville, NC (US); Scott Thomas Fanning, Los Gatos, CA (US); Haseeb Niazi, Morrisville, NC (US); Kavitha Kamarthy, Milpitas, CA (US); Sheela Rowles, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 904 days.

(21) Appl. No.: 11/862,027

(22) Filed: Sep. 26, 2007

(65) Prior Publication Data
US 2009/0080657 A1 Mar. 26, 2009

(51) Int. Cl.
*H04L 29/06* (2006.01)

(52) U.S. Cl.
USPC .............. 380/279; 380/277; 380/278; 705/71

(58) Field of Classification Search
USPC .............................. 380/277, 278, 279; 705/71
See application file for complete search history.

(56) References Cited

U.S. PATENT DOCUMENTS

| | | | | |
|---|---|---|---|---|
| 6,584,566 B1* | 6/2003 | Hardjono | | 713/163 |
| 7,689,602 B1* | 3/2010 | Sim-Tang | | 707/673 |
| 7,813,510 B2* | 10/2010 | Fu | | 380/279 |
| 8,306,026 B2* | 11/2012 | Anjum et al. | | 370/390 |
| 2003/0161296 A1* | 8/2003 | Butler et al. | | 370/352 |
| 2003/0233364 A1* | 12/2003 | Nakao et al. | | 707/100 |
| 2005/0034150 A1* | 2/2005 | Muraoka | | 725/31 |
| 2005/0044356 A1* | 2/2005 | Srivastava et al. | | 713/163 |
| 2005/0125684 A1* | 6/2005 | Schmidt | | 713/200 |
| 2005/0271210 A1* | 12/2005 | Soppera | | 380/277 |
| 2005/0281265 A1* | 12/2005 | Sakamoto et al. | | 370/390 |
| 2007/0016663 A1* | 1/2007 | Weis | | 709/223 |
| 2007/0076889 A1* | 4/2007 | DeRobertis et al. | | 380/279 |
| 2007/0136413 A1* | 6/2007 | Ishikawa et al. | | 709/200 |
| 2007/0143600 A1* | 6/2007 | Kellil et al. | | 713/163 |
| 2008/0005321 A1* | 1/2008 | Ma et al. | | 709/224 |
| 2008/0013733 A1* | 1/2008 | Johansson et al. | | 380/278 |
| 2008/0019528 A1* | 1/2008 | Kneissler | | 380/279 |
| 2008/0021961 A1* | 1/2008 | Jhawar | | 709/206 |
| 2008/0123855 A1* | 5/2008 | Thomas | | 380/277 |
| 2008/0170692 A1* | 7/2008 | Eastham et al. | | 380/277 |
| 2008/0307054 A1* | 12/2008 | Kamarthy et al. | | 709/206 |
| 2008/0320303 A1* | 12/2008 | Khalid et al. | | 713/163 |
| 2009/0122985 A1* | 5/2009 | Khalid et al. | | 380/255 |
| 2009/0190764 A1* | 7/2009 | Liu | | 380/278 |
| 2009/0198997 A1* | 8/2009 | Yeap et al. | | 713/155 |
| 2010/0017596 A1* | 1/2010 | Schertzinger | | 713/155 |
| 2010/0142711 A1* | 6/2010 | Weis et al. | | 380/277 |

(Continued)

OTHER PUBLICATIONS

K.G. Paterson and A. Yau (2006). "Cryptography in Theory and Practice: The Case of Encryption in IPsec". Eurocrypt 2006, Lecture Notes in Computer Science vol. 4004: 12-29, 23 pages.

*Primary Examiner* — Nathan Flynn
*Assistant Examiner* — Sarah Su
(74) *Attorney, Agent, or Firm* — Weaver Austin Villeneuve & Sampson LLP

(57) ABSTRACT

In one embodiment, group member devices may be divided into at least one cluster, wherein each cluster includes a primary key server designated to synchronize with a master key server. Each cluster further includes at least one registration server configured to communicate with member devices in the group within the cluster and to synchronize with the primary key server.

23 Claims, 8 Drawing Sheets

U.S. PATENT DOCUMENTS

2010/0217967 A1* 8/2010 Viswanathan et al. ............ 713/2
2011/0164752 A1* 7/2011 Wainner et al. ............... 380/277
2011/0243331 A1* 10/2011 Yasuda et al. ................. 380/279
2011/0255695 A1* 10/2011 Lindholm et al. ............ 380/278

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-!
! Next Payload !   Reserved    ! Payload Length                !
+-+-+-+-+-+-+-+-+-+-+-+-+-+-+-+-+-+-+-+-+-+-+-+-+-+-+-+-+-+-+-+-!
!                           Identifier                          !
+-+-+-+-+-+-+-+-+-+-+-+-+-+-+-+-+-+-+-+-+-+-+-+-+-+-+-+-+-+-+-+-!
```

FIG. 1

```
+-+-+-+-+-+-+-+-+-+-+-+-+-+-+-+-+-+-+-+-+-+-+-+-+-+-+-+-+-+-+-+-+
~                        ISAKMP Header                         ~
+-+-+-+-+-+-+-+-+-+-+-+-+-+-+-+-+-+-+-+-+-+-+-+-+-+-+-+-+-+-+-+-+
~                        HASH payload                          ~
+-+-+-+-+-+-+-+-+-+-+-+-+-+-+-+-+-+-+-+-+-+-+-+-+-+-+-+-+-+-+-+-+
~                    COOP Key server Header                    ~
+-+-+-+-+-+-+-+-+-+-+-+-+-+-+-+-+-+-+-+-+-+-+-+-+-+-+-+-+-+-+-+-+
~                       Cluster-ID [TBD]                       ~
+-+-+-+-+-+-+-+-+-+-+-+-+-+-+-+-+-+-+-+-+-+-+-+-+-+-+-+-+-+-+-+-+
~                          ID Payload                          ~
+-+-+-+-+-+-+-+-+-+-+-+-+-+-+-+-+-+-+-+-+-+-+-+-+-+-+-+-+-+-+-+-+
~                    Sequence number payload                   ~
+-+-+-+-+-+-+-+-+-+-+-+-+-+-+-+-+-+-+-+-+-+-+-+-+-+-+-+-+-+-+-+-+
~                     Policy Creator Payload                   ~
+-+-+-+-+-+-+-+-+-+-+-+-+-+-+-+-+-+-+-+-+-+-+-+-+-+-+-+-+-+-+-+-+
~                          SA Payload                          ~
+-+-+-+-+-+-+-+-+-+-+-+-+-+-+-+-+-+-+-+-+-+-+-+-+-+-+-+-+-+-+-+-+
~                          KD Payload                          ~
+-+-+-+-+-+-+-+-+-+-+-+-+-+-+-+-+-+-+-+-+-+-+-+-+-+-+-+-+-+-+-+-+
```

FIG. 2

ACTIVE-ACTIVE HIERARCHICAL KEY SERVERS

BACKGROUND

1. Technical Field

The present disclosure relates to computer networking.

2. Description of the Related Art

Virtual Private Networks (VPNs) allow private subscribers (for example, employees of the same company) to communicate privately over public networks, such as the Internet. Cryptography enabled VPNs can be used to enable the subscribers to transfer confidential data over a private or publicly accessible network. Such VPN architectures can sometimes include a key server that manages the deployment of cryptographic information including group keys within the VPN to authorize VPN subscribers, or group members. As such, conventional key server protocols provide for various means of updating and distributing cryptographic information within the VPN.

BRIEF DESCRIPTION OF THE DRAWINGS

FIG. 1 illustrates an example COOP payload format.
FIG. 2 illustrates an example COOP message format.

DESCRIPTION OF EXAMPLE EMBODIMENTS

Overview

Figure 3:
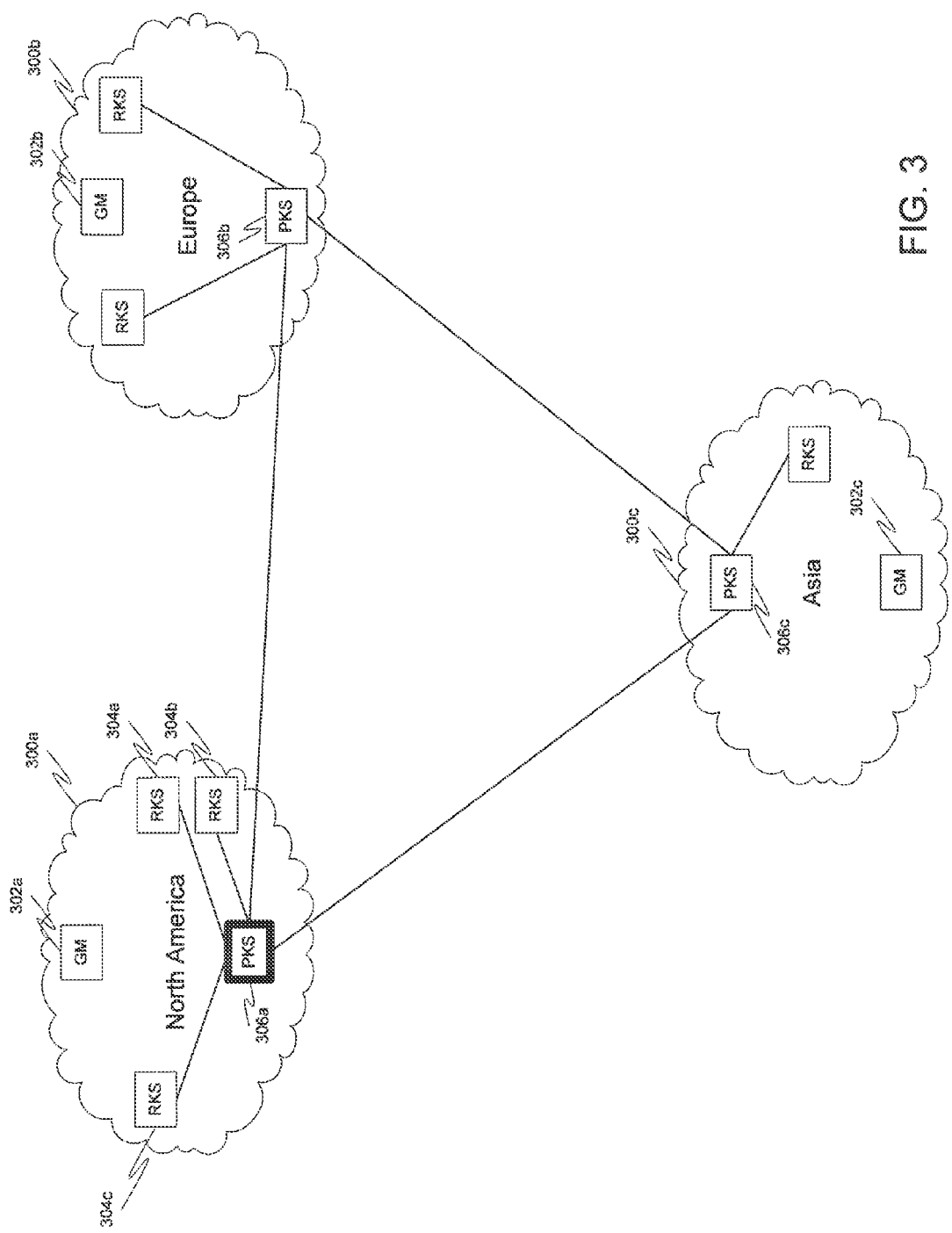
FIG. 3 illustrates an example system.

In one embodiment, group member devices may be divided into at least one cluster, wherein each cluster includes a primary key server designated to synchronize with a master key server. Each cluster further includes at least one registration server configured to communicate with member devices in the group within the cluster and to synchronize with the primary key server.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

The components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Embodiments wherein switches are used operating an internetwork operating system.

Group Encrypted Transport (GET) VPNs offer an efficient framework for any-to-any secured communication using group key VPN techniques. This framework allows for subscribers, also known as group members (GMs), to reside in geographically dispersed locations and securely communicate with each other. Customers including enterprises may prefer the GET VPN framework due to its any-to-any cryptographic nature.

Customer networks may span multiple countries and/or continents and may require multiple key servers distributed across the globe. One mechanism to accomplish this in GET VPN is for the GMs to register to a Key Server (KS) based a configured parameter such as the Key Server address. In the VPN network having more than one KS, the KSs may use a cooperative (COOP) protocol among themselves to elect one of the KSs as a primary KS (PKS). The PKS is then designated to generate and deliver cryptographic information, such as rekeys (updated keys) to all the GMs in the GET VPN. This, however, can be inefficient when dealing with geographically dispersed GMs. For example, a PKS in the United states may send cryptographic information to thousands of GMs all over the world.

In one embodiment, a registration key server (RKS), which is a server to which all GMs register, is made responsible for periodically sending out the cryptographic information to all the registrants. This reduces the load on the PKS.

In another embodiment, a hierarchical key server model is utilized that divides the GET VPN network into a plurality of smaller clusters. These clusters may be based on geographic location, such as content, country, state, etc. or based on other factors, such as company divisions or departments. Each cluster has key servers to handle GM registration as well as periodically deliver cryptographic information to the GMs within the cluster. The cryptographic information generation may be performed exclusively by the KS designated as topmost in the KS hierarchy (described in more detail below). The KS hierarchy may be maintained such that cryptographic (e.g., keying) information flows from the topmost KS hierarchical level to the bottommost hierarchical level before reaching the GMs The hierarchical KS model may define the following types of KSs according to their roles. It should be noted that the names of the types of servers are solely for the purpose of differentiating between the key server types and should not be read in any way as limiting the functionality of any of the servers.

A registration key server (RKS) is defined as the KS that may be responsible for handling the GM registration as well as responsible for unicasting the keying information to the registered GMs. Thus, the RKS communicates with the GMs within a cluster. There may be multiple RKSs per cluster. The RKSs also synchronize with a primary key server. For purposes of this document, the term "synchronize" shall be construed to mean taking some action or actions to ensure that cryptographic information on one entity is identical to cryptographic information on another entity such as, for example, by copying updated cryptographic information from one entity to another.

A primary key server (PKS) is defined as the KS that may be responsible for synchronizing with the RKSs within a cluster as well as for communicating with PKSs in other clusters. There may be only one PKS per cluster. The PKS also synchronizes with a master key server.

A master key server (MKS) is the topmost key server in the hierarchy. It may be chosen by the PKSs and is responsible for generating the cryptographic information. There may be only one MKS per group. The MKS may synchronize with the PKSs.

The terms RKS, PKS, and MKS in no way imply that these components reside on separate or distinct physical devices. Indeed, it is possible to operate all three components on the same physical device. In one embodiment, however, each RKS operates on its own physical device as does each PKS. The MKS, however, is simply one of the PKSs that has been elected as the MKS.

Each KS may be identified by its cluster identifier, which may be an alphanumeric identifier. The cluster identifier may act as a global identifier to the KS and may be provisioned manually. This identifier may also be conveyed within the COOP message as depicted in the example COOP payload of FIG. 1. In one embodiment, the encoding of the cluster identifier may be performed as depicted in the example COOP message format of FIG. 2.

The PKS selection may be performed by the RKSs within a cluster. The RKSs may establish the initial COOP messages with the other RKSs within the same cluster. This may be performed by referencing the common cluster-identifier in the payload of the COOP messages. The RKSs may then synchronize information with the PKS of the same cluster. Each RKS may synchronize, via, for example, a COOP announce message), with only the PKS of the same cluster. Nevertheless, they may keep the IKE channels open with all other RKSs within the cluster.

The PKS may be the only KS eligible to communicate with any KS outside the cluster. This eligibility may be conveyed by setting a "primary" status field within the COOP message. The PKS may then honor the incoming COOP request only if the request is (1) from another PKS (as identified by the "primary" status field being set, along with a different cluster identifier); or (2) from an RKS inside the cluster (as identified by the request having the same cluster identifier as the PKS). If any KS other than a PKS receives an incoming OOP request that has a different cluster identifier and has the primary field set, then the KS may return the address of the PKS in its cluster as a response and close the IKE session. This allows the PKS to directly discover the PKSs in other clusters. For purposes of this document, the term "honoring" shall be construed to mean handling as a legitimate or otherwise relevant request or command, in contrast with, for example, rejecting or ignoring the request or command.

The PKSs of different clusters may select the MKS by communicating with each other using the COOP protocol. The MKS may then set a new flag within the COOP message to convey that it is the master. The MKS election may be based on various criteria different from the criteria used to elect a PKS. The MKS may set a new flag within the COOP message to convey that it is the master. The PKSs may then synchronize (via COOP announce messages) with only the MKS. However, they may keep IKE channels open with all other PKSes.

In one embodiment, PKS to MKS COOP messages may include the exchange of cryptographic information such as keying, group, and policy information and may exclude group member specific information. The MKS may maintain a database of all PKSs and their interests in receiving cryptographic information for different groups.

In one embodiment, during any RKS failure in a cluster, the PKS in that cluster may take the responsibility of the failed RKS (i.e., directly delivering the cryptographic information to the GMs that were registered with the failed RKS). If a PKS fails, then a new PKS may be elected within the cluster.

Various embodiments of the invention may therefore result in greatly improved scalability of key server deployment, reduction of the delay in primary key server selection, minimization of the number of keying messages traversing continental links, reduction of the number of IKE/COOP sessions in the GET-VPN network, and easing of network management.

FIG. 3 illustrates an example system. Clusters 300a, 300b, 300c may comprise member devices that are divided into clusters by continent, here North America, Europe, and Asia respectively. The group member devices are shown as 302a, 302b, and 302c. Within each cluster reside one or more registration key servers 304a, 304b, 304c and a primary key server 306a. The primary key servers 306a, 306b, 306c may communicate with a master key server. In this embodiment, the master key server resides on the same machine as the primary key server 306a. This is depicted by the bolding of the edges of primary key server 306a whereas the edges of primary key servers 306b and 306c are left unbolded.

Figure 4:
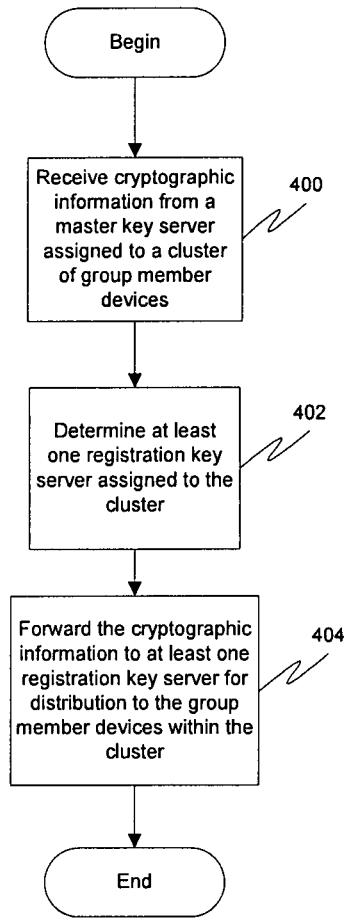
FIG. 4 illustrates an example method.

FIG. 4 illustrates an example method. This method describes a process that may be performed by a primary key server assigned to a cluster of group member devices. At 400, cryptographic information is received from a master key server. This cryptographic information may be included in a message in a cooperative protocol. It should be noted that other messages in the cooperative protocol may also be received. Upon receipt of a message in a cooperative protocol, the primary key server may honor the packet if the packet is from another primary key server or is from a registration key server within the cluster (as determined by examining if the message has a primary flag set and a cluster identifier matching the cluster identifier of the primary key server). At 402, at least one registration key server assigned to the cluster is determined. At 404, the cryptographic information is forwarded to at least one registration key server for distribution to the group member devices within the cluster.

Figure 5:
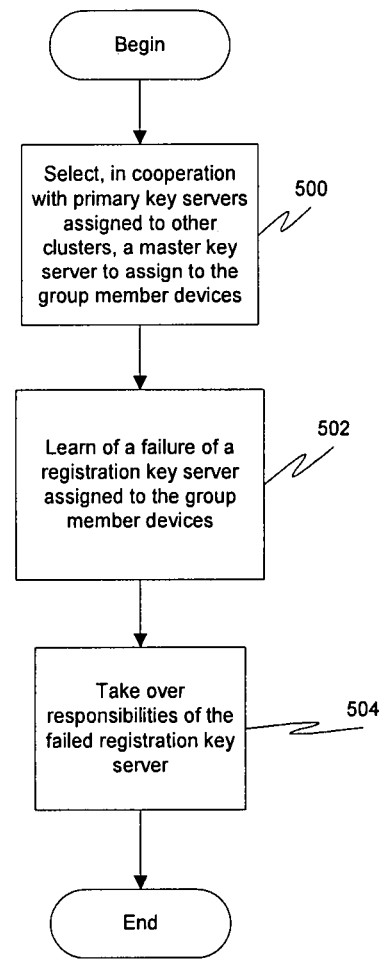
FIG. 5 illustrates another example method.

FIG. 5 illustrates another example method. This method describes another process that may be performed by a primary key server assigned to a cluster of a group of member devices. At 500, the primary key server may select, in cooperation with primary key servers assigned to other clusters, a master key server to assign to the group member devices. At 502, the primary key server may learn of a failure of a registration key server assigned to the group member devices. This learning may occur in a number of different ways. In one embodiment, the primary key server may periodically "ping" the registration key servers to see if they are active. In another embodiment, the primary key server may be alerted by a registration key server that it is going to be inactive. At 504, the primary key server may take over the responsibilities of the failed registration key server.

Figure 6:
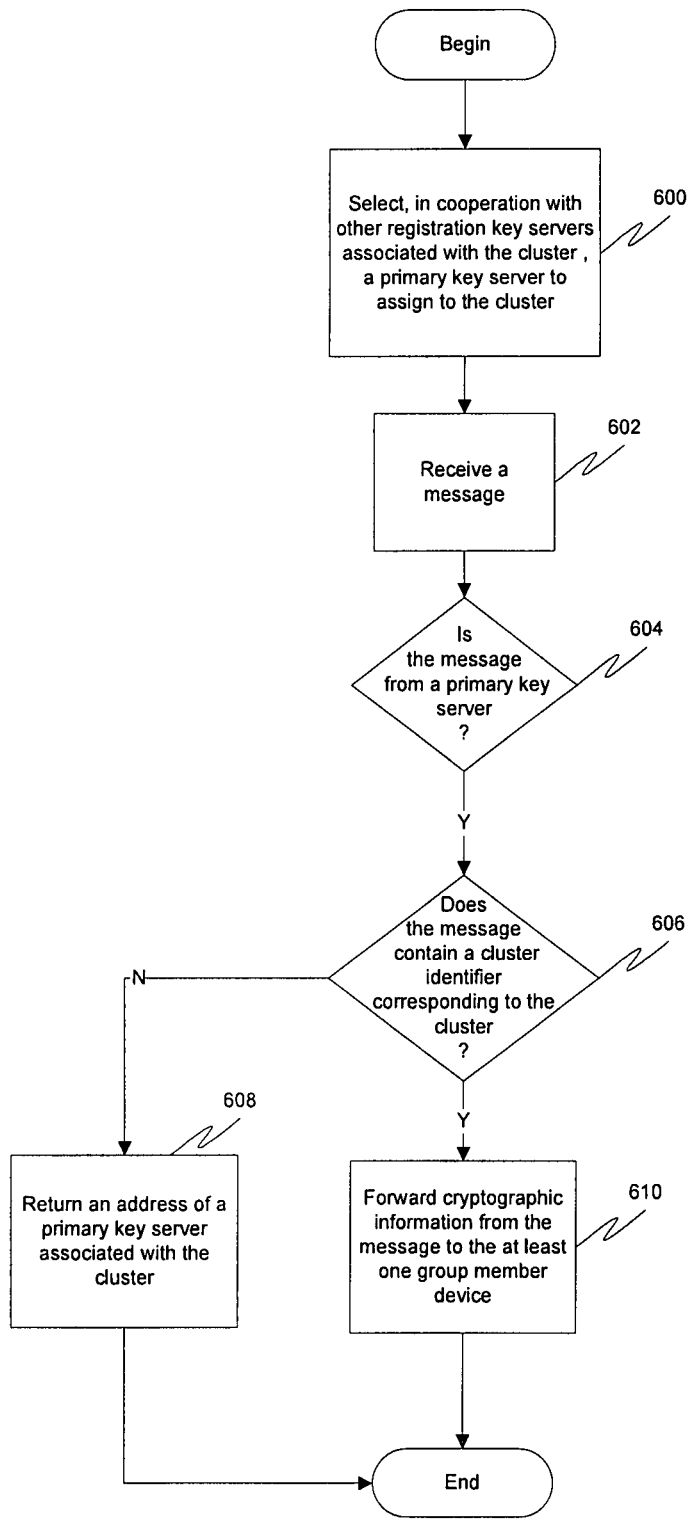
FIG. 6 illustrates another example method.

FIG. 6 illustrates another example method. This method describes a process that may be performed by a registration key server assigned to a cluster of group member devices. At 600, a primary key server to assign to the cluster may be selected in cooperation with other registration key servers within the cluster. At 602, a message is received. This message may be in a cooperative protocol. At 604, it is determined if the message is received from a primary key server. At 606, it is determined if the message contains a cluster identifier corresponding to the cluster. If the message is received from a primary key server but the message does not contain a cluster identifier corresponding to the cluster, then at 608 an address of a primary key server associated with the cluster may be returned. If the message is received from a primary key server and the message does contain a cluster identifier corresponding to the cluster, then at 610 cryptographic information is forwarded from the message to the at least one group member device.

Figure 7:
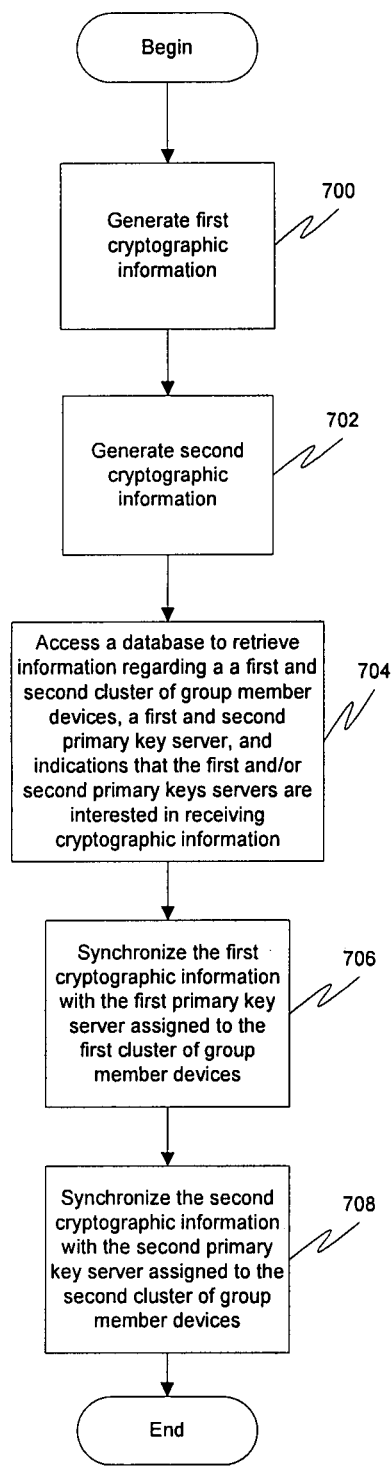
FIG. 7 illustrates another example method.

FIG. 7 illustrates another example method. This method describes a process that may be performed by a master key server. At 700, first cryptographic information is generated. At 702, second cryptographic information is generated. At 704, a database may be accessed to retrieve information regarding a first and second cluster of group member devices, first and second primary key servers, and indications that the first and/or second primary key servers are interested in receiving cryptographic information. At 706, the first cryptographic information is synchronized with the first primary key server assigned to the first cluster of group member devices. At 708, the second cryptographic information is synchronized with the second primary key server assigned to the second cluster of group member devices.

Figure 8:
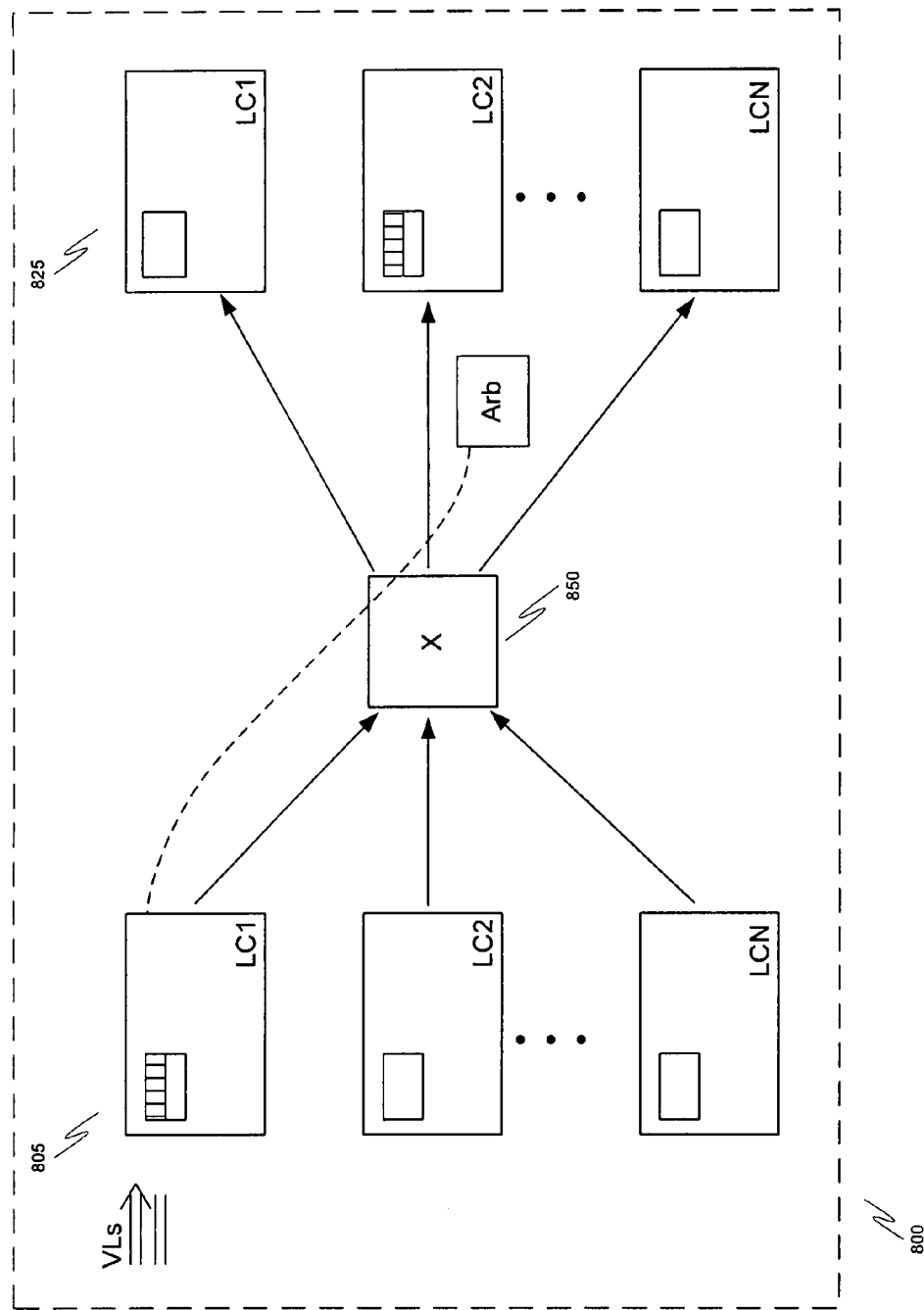
FIG. 8 illustrates an example simplified architecture of a switch.

FIG. 8 illustrates a simplified architecture of a switch 800. Switch 800 includes N line cards, each of which characterized by an ingress side (or input) 805 and an egress side (or output) 825. Line card ingress sides 805 are connected via switching fabric 850, which includes a crossbar in this example, to line card egress sides 825. In this embodiment, one or more line cards performs one or more of the processes described above.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A system comprising:
   a master key server;
   one or more clusters corresponding to one or more groups, wherein each cluster of the one or more clusters includes:
      a primary key server designated to synchronize with the master key server; and
      at least one registration key server configured to communicate with member devices in the group in one or more groups and to synchronize with the primary key server, wherein the at least one registration key server is responsible for handling registration of the member devices within the group and for transmitting cryptographic information received from the primary key server to the member devices of the group that have registered with the registration key server;
      wherein the primary key server honors messages received from the at least one registration key server, and honors messages received from primary key servers of other clusters;
      wherein each of the one or more clusters has associated therewith a single primary key server.

2. The system of claim 1, wherein the primary key server is designated by the at least one registration servers.

3. The system of claim 1, wherein the master key server is designated by two or more primary key servers, wherein each of the two or more primary key servers is associated with a different one of two or more groups.

4. The system of claim 1, wherein the master key server is configured to generate cryptographic information for each of the one or more groups, and to synchronize the cryptographic information with the primary key server within each of the one or more cluster.

5. The system of claim 1, wherein a cluster is assigned a cluster identifier and the at least one registration server and primary key server within the cluster are further configured to insert the cluster identifier in their communications.

6. The system of claim 1, wherein synchronization between the master key server and the primary key server excludes the transfer of any group member device specific information.

7. The system of claim 1, wherein the master key server is further configured to maintain a database of all primary key servers and their interest in cryptographic information for the one or more groups.

8. A method comprising:
   receiving, at a primary key server assigned to a cluster of group member devices, cryptographic information from a master key server;
   determining by the primary key server at least one registration key server assigned to the cluster;
   forwarding the cryptographic information by the primary server to the at least one registration key server for distribution to the group member devices within the cluster, wherein the at least one registration key server is responsible for handling registration of the group member devices within the cluster and for transmitting cryptographic information received from the primary key server to the group member devices within the cluster that have registered with the registration key server;
   receiving, at the primary key server, a message in a cooperative protocol; and
   honoring the message by the primary key server if the message is from another primary key server assigned to another cluster of group member devices or is from one of the at least one registration key server within the cluster, wherein the primary key server honors messages received from the at least one registration key server within the cluster and honors messages received from primary key servers of other clusters;
   wherein each cluster of group member devices has associated therewith a single primary key server.

9. The method of claim 8, further comprising:
   determining by the primary key server that the message is from another primary key server associated with another cluster of group member devices by determining if the message has a primary flag set.

10. The method of claim 8, further comprising:
    determining by the primary key server that the message is from one of the at least one registration key server assigned to the group member devices in the cluster by examining a cluster identifier for the message.

11. The method of claim 8, further comprising:
    selecting, in cooperation with primary key servers assigned to other clusters, a master key server to assign to the group member devices.

12. The method of claim 8, further comprising:
    learning of a failure of one of the at least one registration key server assigned to the cluster; and
    taking over, by the primary key server, responsibilities of the failed registration key server.

13. The method of claim 8, further comprising:
    determining by the primary key server that the message is from another primary key server associated with another cluster of group member devices by determining if the message has a primary flag set and determining that a cluster identifier encoded in the message is different from a cluster identifier of the cluster of group member devices to which the primary key server is assigned.

14. A method comprising:
    receiving, at a registration key server assigned to at least one group member device within a cluster, a message;
    determining by the registration key server whether to forward cryptographic information from the message to the at least one group member device according to whether the message is received from a primary key server and whether the message contains a cluster identifier corresponding to the cluster;

wherein the registration key server is responsible for handling registration of group member device within the cluster and for transmitting the cryptographic information received from the primary key server within the cluster to the group member devices within the cluster that have registered with the registration key server; and wherein the primary key server synchronizes with a master key server;

wherein the primary key server honors messages received from the registration key server, and honors messages received from primary key servers of other clusters; and returning by the registration key server an address of the primary key server associated with the cluster if the message contains another cluster identifier corresponding to another cluster of group member devices, thereby indicating that the message has been received from another primary key server of another cluster of group member devices.

15. The method of claim 14, further comprising:
selecting, in cooperation with other registration key servers within the cluster, the primary key server to assign to the cluster.

16. The method as recited in claim 14, wherein the primary key server is the only key server capable of communicating with key servers of other clusters of group member devices.

17. The method as recited in claim 14, wherein the primary key server within the cluster honors messages received from the primary key servers of the other clusters.

18. A method comprising:
generating, at a master key server, first cryptographic information;
generating, at the master key server, second cryptographic information;
synchronizing by the master key server the first cryptographic information with a first primary key server assigned to a first cluster of group member devices; wherein the first primary key server is responsible for synchronizing with a first registration key server, wherein the first registration key server is responsible for handling registration of group member devices within the first cluster and for transmitting the first cryptographic information received from primary key servers within the first cluster to the group member devices within the first cluster that have registered with the first registration key server; and
synchronizing by the master key the second cryptographic information with a second primary key server assigned to a second cluster of group member devices, wherein the second primary key server is responsible for synchronizing with a second registration key server, wherein the second registration key server is responsible for handling registration of group member devices within the second cluster and for transmitting the second cryptographic information received from primary key servers within the second cluster to the group member devices within the second cluster that have registered with the second registration key server;
wherein the first primary key server assigned to the first cluster of group member devices communicates with the second primary key server assigned to the second cluster of group member devices.

19. The method of claim 18, wherein the first cryptographic information comprises rekey information.

20. The method of claim 18, further comprising:
accessing a database containing information regarding the first cluster of group member devices, the first primary key server, and an indication that the first primary key server is interested in receiving cryptographic information for the first cluster of group member devices.

21. A switch comprising:
one or more line cards, wherein at least one of the one or more line cards is configured to:
receive, at a primary key server assigned to a cluster of group member devices, cryptographic information from a master key server;
determine by the primary key server at least one registration key server assigned to the cluster;
forward the cryptographic information by the primary key server to the at least one registration key server for distribution to the group member devices within the cluster, the at least one registration key server configured to communicate with the group member devices within the cluster and to synchronize with the primary key server, wherein the at least one registration key server is responsibly for handling registration of the member devices within the cluster and for transmitting the cryptographic information received from the primary key server to the group member devices within the cluster that have registered with the at least one registration key server;
receive, at the primary key server, a message in a cooperative protocol; and
honor the message by the primary key server if the message is from another primary key server assigned to another cluster of group member device or is from one of the at least one registration key server within the cluster, wherein the primary key server honors messages received from the at least one registration key server within the cluster and honors messages received from primary key servers of other clusters;
wherein each cluster of group member devices has associated therewith a single primary key server.

22. An apparatus comprising:
one or more line cards, wherein at least one of the one or more line cards is configured to:
receive, at a registration key server assigned to at least one group member device within a cluster, a message;
determine by the registration server if the message is received from one of at least one primary key server and if the message contains a cluster identifier corresponding to the cluster;
forward by the registration key server cryptographic information from the message to the at least one group member device if the message is received from one of the at least one primary key server and if the message contains the cluster identifier corresponding to the cluster;
wherein the primary key server synchronizes with a master key server;
wherein the primary key server honors messages received from the registration key server, and honors messages received from primary key servers of other cluster;
wherein the registration key server is responsible for handling registration of group member devices within the cluster and for transmitting cryptographic information received from the one of the at least one primary key server within the cluster to the group member devices within the cluster that have registered with the registration key server; and return by the registration key server address of the primary key server associated with the cluster if the message contains another cluster identifier corresponding to another cluster of group member devices, thereby indicating that the message has been received from another primary key server of another cluster of group member devices.

23. A switch comprising:
one or more line cards, wherein at least one of the one or more line cards is configured to:
   generate, at a master key server, first cryptographic information;
   generate, at the master key server, second cryptographic information;
   synchronize by the master key server the first cryptographic information with a first primary key server assigned to a first cluster of group member devices; wherein the first primary key server is responsible for synchronizing with a first registration key server, wherein the first registration key server is responsible for handling registration of the group member devices within the first cluster and for transmitting the first cryptographic information received from primary key server within the first cluster to the group member devices within the first cluster that have registered with the first registration key server; and
   synchronize by the master key server the second cryptographic information with a second primary key server assigned to a second cluster of group member devices; wherein the second primary key server is responsible for synchronizing with a second registration key server, wherein the second registration key server is responsible for handling registration of the group member devices within the second cluster and for transmitting the second cryptographic information received from primary key servers within the second cluster to the group member devices within the second cluster that have registered with the second registration key server;
   wherein the first primary key server assigned to the first cluster of group member devices communicated with the second primary key server assigned to the second cluster of group member devices.

* * * * *